United States Patent
Suciu et al.

(10) Patent No.: US 9,938,900 B2
(45) Date of Patent: Apr. 10, 2018

(54) CERAMIC MATRIX COMPOSITE TURBINE EXHAUST CASE FOR A GAS TURBINE ENGINE

(75) Inventors: Gabriel L. Suciu, Glastonbury, CT (US); Ioannis Alvanos, West Springfield, MA (US); Brian D. Merry, Andover, CT (US)

(73) Assignee: United Technologies Corporation, Farmington, CT (US)

( * ) Notice: Subject to any disclaimer, the term of this patent is extended or adjusted under 35 U.S.C. 154(b) by 919 days.

(21) Appl. No.: 13/116,116

(22) Filed: May 26, 2011

(65) Prior Publication Data

US 2012/0297791 A1    Nov. 29, 2012

(51) Int. Cl.
| | |
|---|---|
| F02C 7/20 | (2006.01) |
| F01D 9/04 | (2006.01) |
| F01D 25/30 | (2006.01) |
| F02K 1/04 | (2006.01) |

(52) U.S. Cl.
CPC ............... *F02C 7/20* (2013.01); *F01D 9/041* (2013.01); *F01D 25/30* (2013.01); *F02K 1/04* (2013.01); *F05D 2300/6033* (2013.01); *Y02T 50/672* (2013.01); *Y02T 50/673* (2013.01); *Y10T 29/4932* (2015.01)

(58) Field of Classification Search
CPC ..... F02K 9/97; F02K 1/04; F02C 7/20; F01D 9/041; F01D 25/30
USPC ....... 60/226.1, 262, 753, 766, 770, 796, 797
See application file for complete search history.

(56) References Cited

U.S. PATENT DOCUMENTS

| | | | |
|---|---|---|---|
| 2,938,336 A * | 5/1960 | Peterson | ......................... 60/39.5 |
| 6,648,597 B1 | 11/2003 | Widrig et al. | |
| 7,249,462 B2 | 7/2007 | Aumont et al. | |
| RE39,972 E | 1/2008 | Royalty | |
| 7,805,925 B2 | 10/2010 | Durocher et al. | |
| 7,866,162 B2 * | 1/2011 | Blanchard et al. | ............. 60/796 |
| 8,262,345 B2 | 9/2012 | Andrew | |
| 2002/0073690 A1* | 6/2002 | Tse | ................................. 60/204 |
| 2004/0253096 A1* | 12/2004 | Legg | ........................ F01D 9/04 |
| | | | 415/191 |
| 2006/0147692 A1* | 7/2006 | Kmetz | ....................... 428/292.1 |
| 2008/0092514 A1* | 4/2008 | Suciu et al. | ................. 60/39.43 |
| 2009/0226746 A1* | 9/2009 | Chakrabarti et al. | ......... 428/469 |
| 2012/0279631 A1 | 11/2012 | Mizokami et al. | |

FOREIGN PATENT DOCUMENTS

| | | |
|---|---|---|
| EP | 1873385 | 1/2008 |
| FR | 2699227 | 6/1994 |
| FR | 2949820 | 3/2011 |
| JP | 2000247745 | 9/2000 |
| WO | 2006007686 | 1/2006 |

(Continued)

OTHER PUBLICATIONS

European Search Report for European Patent Application No. 12169232.1 completed on Aug. 16, 2013.

(Continued)

*Primary Examiner* — Craig Kim

(74) *Attorney, Agent, or Firm* — Carlson, Gaskey & Olds P.C.

(57) ABSTRACT

A turbine exhaust case for a gas turbine engine includes a multiple of CMC turbine exhaust case struts between a CMC core nacelle aft portion and a CMC tail cone.

9 Claims, 4 Drawing Sheets

(56) References Cited

FOREIGN PATENT DOCUMENTS

| | | |
|---|---|---|
| WO | 2006060006 | 6/2006 |
| WO | 2009131793 | 10/2009 |
| WO | 2010026354 | 3/2010 |

OTHER PUBLICATIONS

Opposition for European Pat. No. 2570606. Patent Holder United Technologies Corporation. Challenger Safran Aircraft Engines. dated Aug. 2, 2016. p. 1-17.
Opposition for European Pat. No. 2570606. Patent Holder United Technologies Corporation. Challenger Safran Aircraft Engines. dated Aug. 2, 2016. p. 1-17. (English Translation).

* cited by examiner

CERAMIC MATRIX COMPOSITE TURBINE EXHAUST CASE FOR A GAS TURBINE ENGINE

BACKGROUND

The present disclosure relates to a gas turbine engine, and more particularly to Ceramic Matrix Composites (CMC) turbine exhaust case components therefor.

Components in sections of gas turbine engines which operate at elevated temperatures in a strenuous, oxidizing type of gas flow environment are typically manufactured of high temperature superalloys. The aft most section of the gas turbine engine is typically a turbine exhaust case, having a nozzle and a tail cone that are fastened together to form the assembly.

SUMMARY

A turbine exhaust case for a gas turbine engine according to an exemplary aspect of the present disclosure includes a multiple of CMC turbine exhaust case struts between a CMC core nacelle aft portion and a CMC tail cone.

A gas turbine engine according to an exemplary aspect of the present disclosure includes a CMC turbine exhaust case mounted to a turbine case.

A method of assembling a gas turbine engine according to an exemplary aspect of the present disclosure includes mounting a CMC turbine exhaust case to a turbine case.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
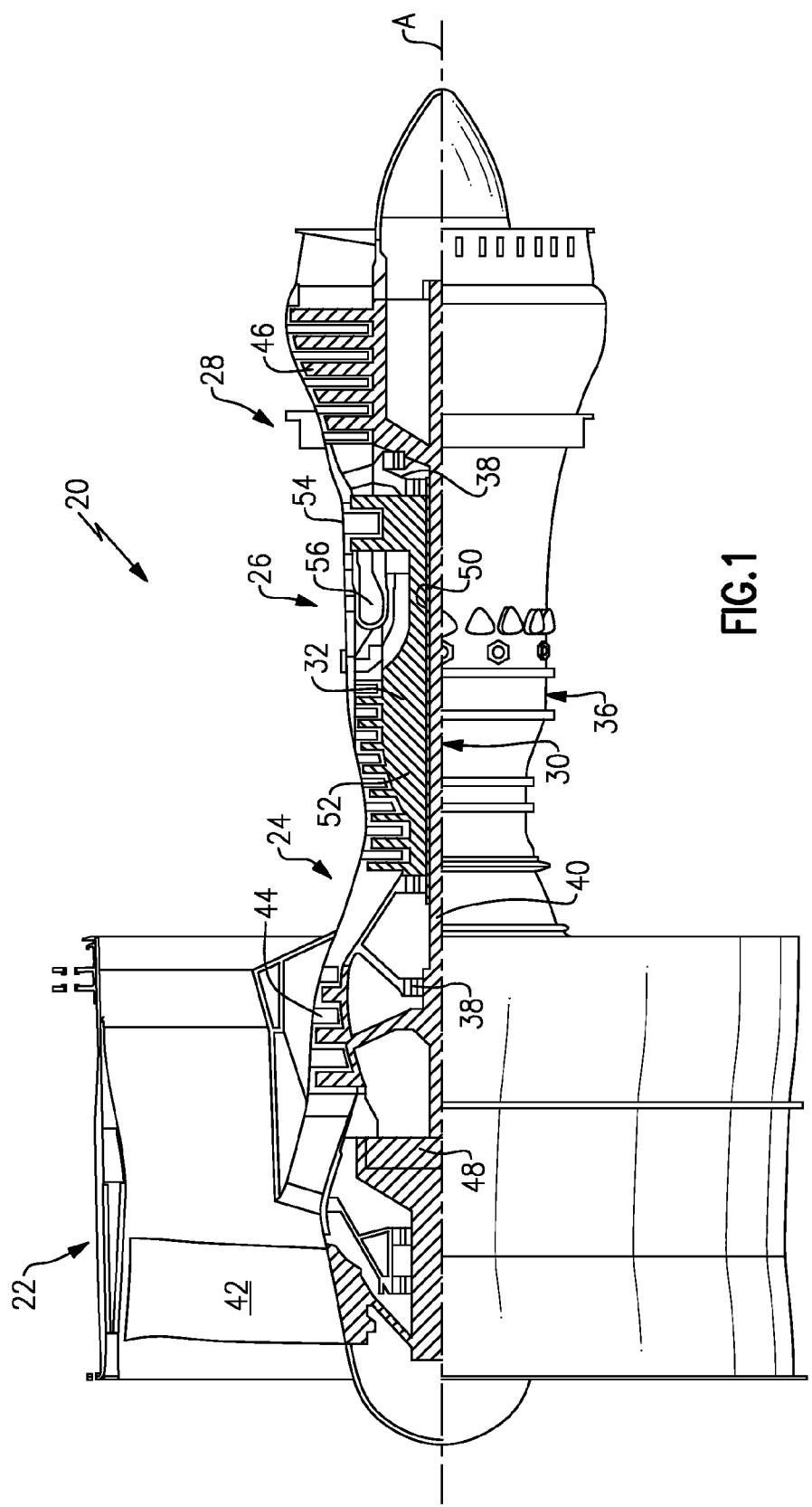
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 54, 46 rotationally drive the respective low speed spool 30 and high speed spool 32 in response to the expansion.

Figure 2:
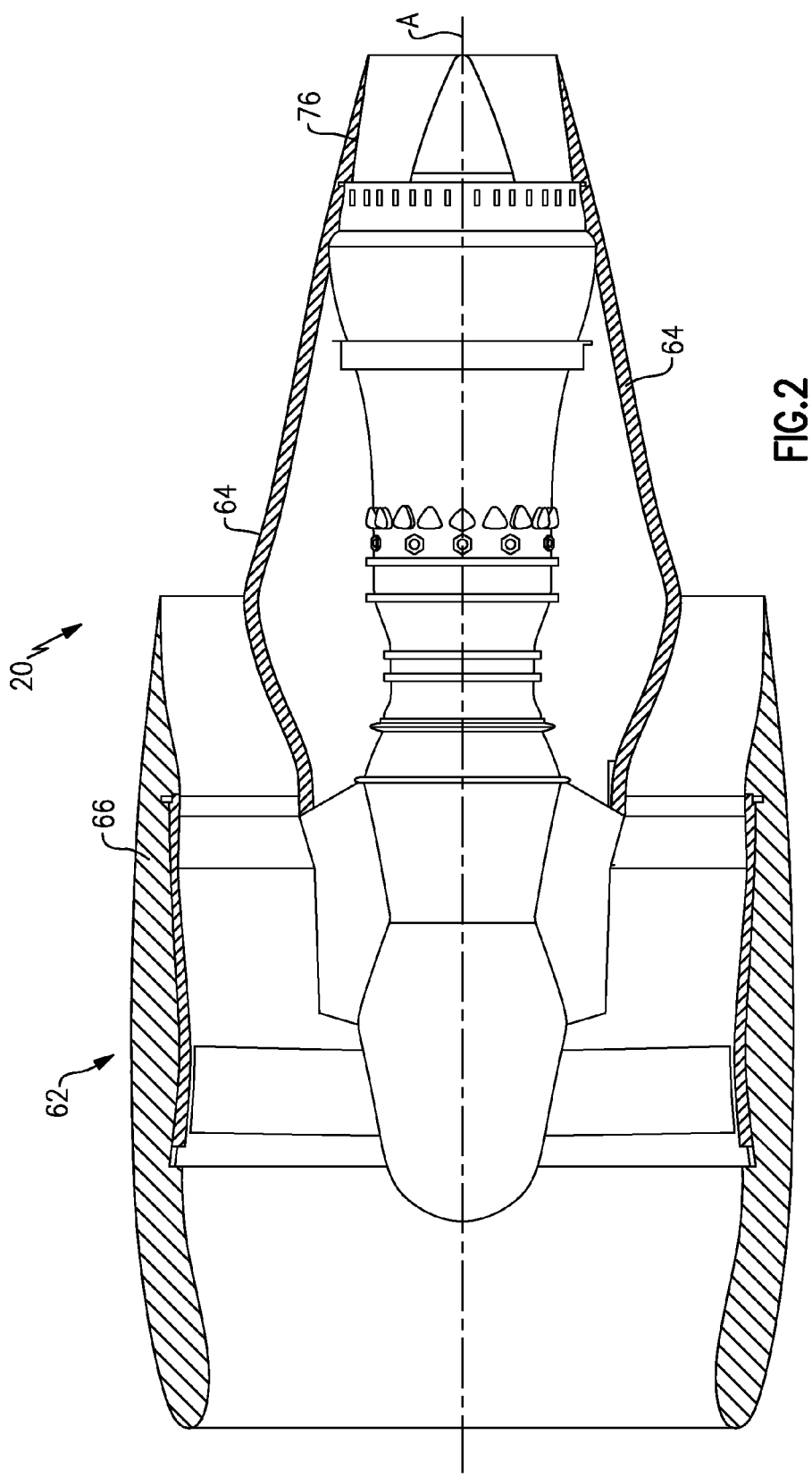
FIG. 2 is an enlarged sectional view of a section of the gas turbine engine.
Figure 3:
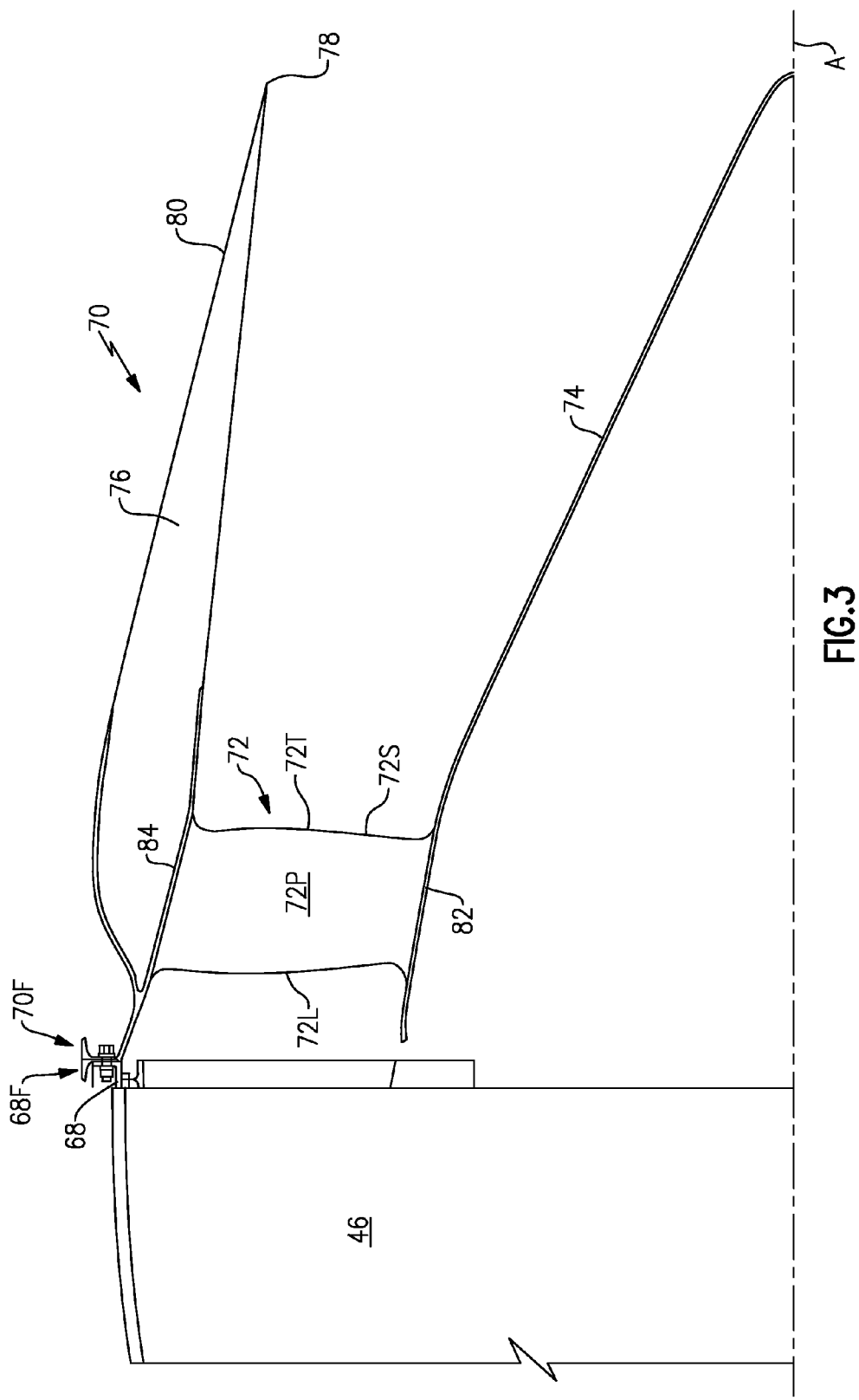
FIG. 3 is a schematic cross-section of a CMC turbine exhaust case mounted to a turbine case.

With reference to FIG. 2, the gas turbine engine 20 is mounted within an engine nacelle assembly 62 as is typical of an aircraft designed for subsonic operation. The nacelle assembly 62 generally includes a core nacelle 64 and a fan nacelle 66. It should be understood that although a particular component arrangement is disclosed in the illustrated embodiment, various pylon structures and nacelle assemblies will benefit herefrom. With reference to FIG. 3, the low pressure turbine 46 generally includes a low pressure turbine case 68 with a multiple of low pressure turbine stages. In one disclosed non-limiting embodiment, the low pressure turbine case 68 is manufactured of a ceramic matrix composite (CMC) material or metal superalloy. It should be understood that examples of CMC material for all componentry discussed herein may include, but are not limited to, for example, S200 and SiC/SiC. It should be also understood that examples of metal superalloy for all componentry discussed herein may include, but are not limited to, for example, INCO 718 and Waspaloy. Although depicted as a low pressure turbine in the disclosed embodiment, it should be understood that the concepts described herein are not limited to use with low pressure turbine as the teachings may be applied to other sections such as high pressure turbine, high pressure compressor, low pressure compressor and intermediate pressure turbine and intermediate pressure turbine of a three-spool architecture gas turbine engine.

Figure 4:
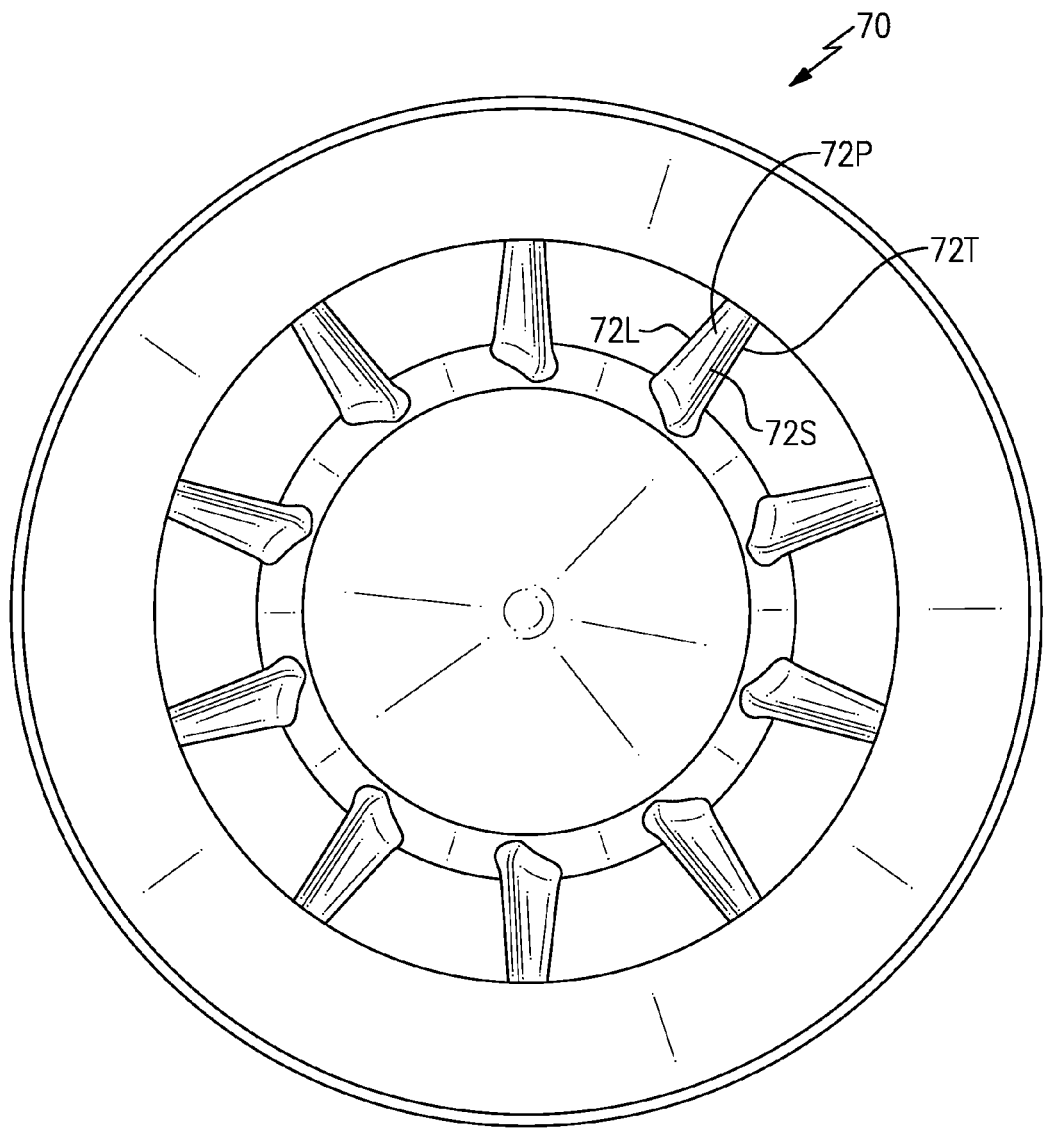
FIG. 4 is a perspective view of the CMC turbine exhaust case.

A CMC turbine exhaust case 70 is mounted downstream of the low pressure turbine 46 at a flange 70F which mounts to a flange 68F of the low pressure turbine case 68. The CMC turbine exhaust case 70 is manufactured of a ceramic matrix composite (CMC) material and defines a multiple of turbine exhaust case struts 72, a tail cone 74 and a core nacelle aft portion 76 as a single integral CMC structure. The multiple of turbine exhaust case struts 72 are radially disposed aerodynamic members may be of various forms and multiples. Although a somewhat generic turbine exhaust case strut 72 will be described herein, it should be understood that various static airfoils may be particularly amenable to the fabrication described herein. Each turbine exhaust case strut 72 is defined between a respective leading edge 72L and a trailing edge 72T. Each turbine exhaust case strut 72 includes a generally concave shaped portion which forms a pressure side 72P and a generally convex shaped portion which forms a suction side 72S (FIG. 4). The CMC tail cone 74 is a generally conical member. The core nacelle aft portion 76 defines a trailing edge 78 and an outer aerodynamic surface 80 for essentially uninterrupted flow along the core nacelle 64. That is, the outer aerodynamic surface 80 is the outermost surface of the core nacelle 64 which heretofor have been independent structures.

In one non-limiting embodiment, the turbine exhaust case 70 possess a ring-strut-ring construction in which the multiple of turbine exhaust case struts 72 are bonded by full inner diameter and outer diameter full hoop rings 82, 84 which respectively extend to form the tail cone 74 and the core nacelle aft portion 76. The tail cone 74 and the core nacelle aft portion 76 extensions may also be formed as full hoop rings to provide the desired rigidity.

The CMC turbine exhaust case 70 provides for significant weight and cost reduction through, for example, the removal of bulking flanges and fasteners.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine comprising:
   a turbine case; and
   a CMC turbine exhaust case mounted to said turbine case, wherein said CMC turbine exhaust case includes a CMC core nacelle aft portion, a CMC tail cone connected to said CMC core nacelle aft portion, and a multiple of CMC turbine exhaust case struts bonded to and extending between said CMC core nacelle aft portion and said CMC tail cone, and wherein said turbine case is a low pressure turbine case;
   wherein said CMC turbine exhaust case is mounted to said turbine case at a flange; and
   wherein CMC core nacelle aft portion, said CMC tail cone and said turbine case are arranged along a turbine axis, and said CMC turbine exhaust case is mounted to said turbine case at said flange such that said CMC tail cone is axially spaced apart from said turbine case relative to said turbine axis.

2. The gas turbine engine as recited in claim 1, wherein said turbine case is manufactured of CMC.

3. The gas turbine engine as recited in claim 1, wherein said CMC core nacelle aft portion, said CMC tail cone and said multiple of CMC turbine exhaust case struts are integrally formed as a single CMC structure.

4. A method of assembling a gas turbine engine comprising:
   mounting a CMC turbine exhaust case to a turbine case, wherein said CMC turbine exhaust case includes a CMC core nacelle aft portion, a CMC tail cone connected to said CMC core nacelle aft portion, and a multiple of CMC turbine exhaust case struts bonded to and extending between said CMC core nacelle aft portion and said CMC tail cone;
   defining at least a portion of a core nacelle with the CMC turbine exhaust case; and
   integrally forming said CMC core nacelle aft portion and said CMC tail cone with said multiple of CMC turbine exhaust case struts extending therebetween.

5. The method as recited in claim 4, further comprising: bolting the CMC turbine exhaust case to the turbine case.

6. The method as recited in claim 4, further comprising: defining at least a portion of an aerodynamic outer surface of the core nacelle with the CMC turbine exhaust case.

7. The method as recited in claim 4, further comprising: defining a trailing edge of the core nacelle with the CMC turbine exhaust case.

8. The method of assembling a gas turbine as recited in claim 4, wherein said multiple of CMC turbine exhaust case struts are bonded to and extend between a pair of circular shaped CMC hoop rings, wherein said CMC hoop rings extend to form said CMC core nacelle aft portion and said CMC tail cone.

9. The method of assembling a gas turbine as recited in claim 4, further comprising:
   forming said CMC core nacelle aft portion and said CMC tail cone as hoop rings.

* * * * *